US012775344B2

(12) United States Patent
Longo et al.

(10) Patent No.: US 12,775,344 B2
(45) Date of Patent: Oct. 27, 2026

(54) TOUCH INPUT DEVICE

(71) Applicant: Microsoft Technology Licensing, LLC, Redmond, WA (US)

(72) Inventors: Thomas Joseph Longo, Sammamish, WA (US); Tianyu Zhao, Sammamish, WA (US); Nayeem Sardarsab Desai, Bellevue, WA (US); Cecil Tetteh Kumah, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/090,274

(22) Filed: Mar. 25, 2025

(65) Prior Publication Data

US 2026/0299715 A1 Oct. 1, 2026

(51) Int. Cl.

| | |
|---|---|
| ***G06F 3/0354*** | (2013.01) |
| ***G06F 1/16*** | (2006.01) |
| ***G06F 3/02*** | (2006.01) |

(52) U.S. Cl.

CPC .......... *G06F 3/03547* (2013.01); *G06F 1/169* (2013.01); *G06F 3/0202* (2013.01)

(58) Field of Classification Search

CPC .......... G06F 3/0354; G06F 3/07; G06F 1/169; G06F 3/0202

See application file for complete search history.

(56) References Cited

U.S. PATENT DOCUMENTS

| | | | | |
|---|---|---|---|---|
| 11,429,157 | B2 * | 8/2022 | Degner | G06F 3/04883 |
| 12,242,676 | B2 * | 3/2025 | Wang | G06F 1/169 |
| 2004/0191509 | A1 | 9/2004 | Kishioka | |
| 2015/0185769 | A1 * | 7/2015 | Takata | G06F 1/169 345/173 |
| 2015/0293617 | A1 * | 10/2015 | Clayton | G06F 3/041 345/173 |
| 2021/0263556 | A1 * | 8/2021 | Degner | G06F 3/04883 |
| 2023/0376130 | A1 | 11/2023 | Liu | |
| 2024/0427437 | A1 * | 12/2024 | Wang | G06F 1/1662 |

FOREIGN PATENT DOCUMENTS

| | | | |
|---|---|---|---|
| CN | 202600659 | U | 12/2012 |
| CN | 203299774 | U | 11/2013 |
| CN | 103455183 | A | 12/2013 |
| CN | 107515688 | A | 12/2017 |
| CN | 219320757 | U | 7/2023 |

OTHER PUBLICATIONS

Extended European search report received in European Application No. 26165575.7, mailed on Aug. 4, 2026, 09 pages.

* cited by examiner

*Primary Examiner* — Afroza Chowdhury

(74) *Attorney, Agent, or Firm* — Alleman Hall LLP

(57) ABSTRACT

An input device comprises a touch surface and a printed circuit board comprising a switch. A mounting bracket comprises a boss aligned with the switch, and a plurality of flat springs each comprise a bracket end affixed to the mounting bracket and an opposite end coupled to the printed circuit board.

20 Claims, 7 Drawing Sheets

TOUCH INPUT DEVICE

BACKGROUND

Some computing devices include a touchpad for receiving user inputs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to touch input devices and computing devices comprising touch input devices. In some examples, an input device comprises a touch surface and a printed circuit board comprising a switch. A mounting bracket comprises a boss aligned with the switch, and a plurality of flat springs each comprise a bracket end affixed to the mounting bracket and an opposite end coupled to the printed circuit board.

As described in more detail below, and in one potential advantage of the present disclosure, the described configurations provide touch input devices that can consistently trigger actuation of a switch through touch inputs received at a wide variety of locations on the touch surface. Additionally, the disclosed configurations enable low-profile installations that are simple and inexpensive to manufacture.

DETAILED DESCRIPTION

Some computing devices include a touchpad for receiving user inputs. In some devices the touchpad utilizes multiple touch and/or pressure sensors configured to detect user touch contacts. These devices, however, require multiple sensors and related circuitry and components that significantly increase device costs and occupy packaging space that undesirably increases touchpad thickness. In other devices the touchpad is rotatable about a hinge along one side. In these devices, touch inputs received close to the hinge often fail to actuate an underlying switch, while touch inputs in a middle zone of the touchpad surface can provide inconsistent actuation of the switch.

Accordingly, and as described in more detail below, configurations of the present disclosure provide touch input devices and computing devices including touchpads that substantially uniformly transfer a load received from a touch input to reliably trigger actuation of a switch regardless of where the touch input is received on a touch surface of the input device. Additionally, the disclosed touch input devices have a low-profile configuration and are simple and inexpensive to manufacture.

Figure 1:
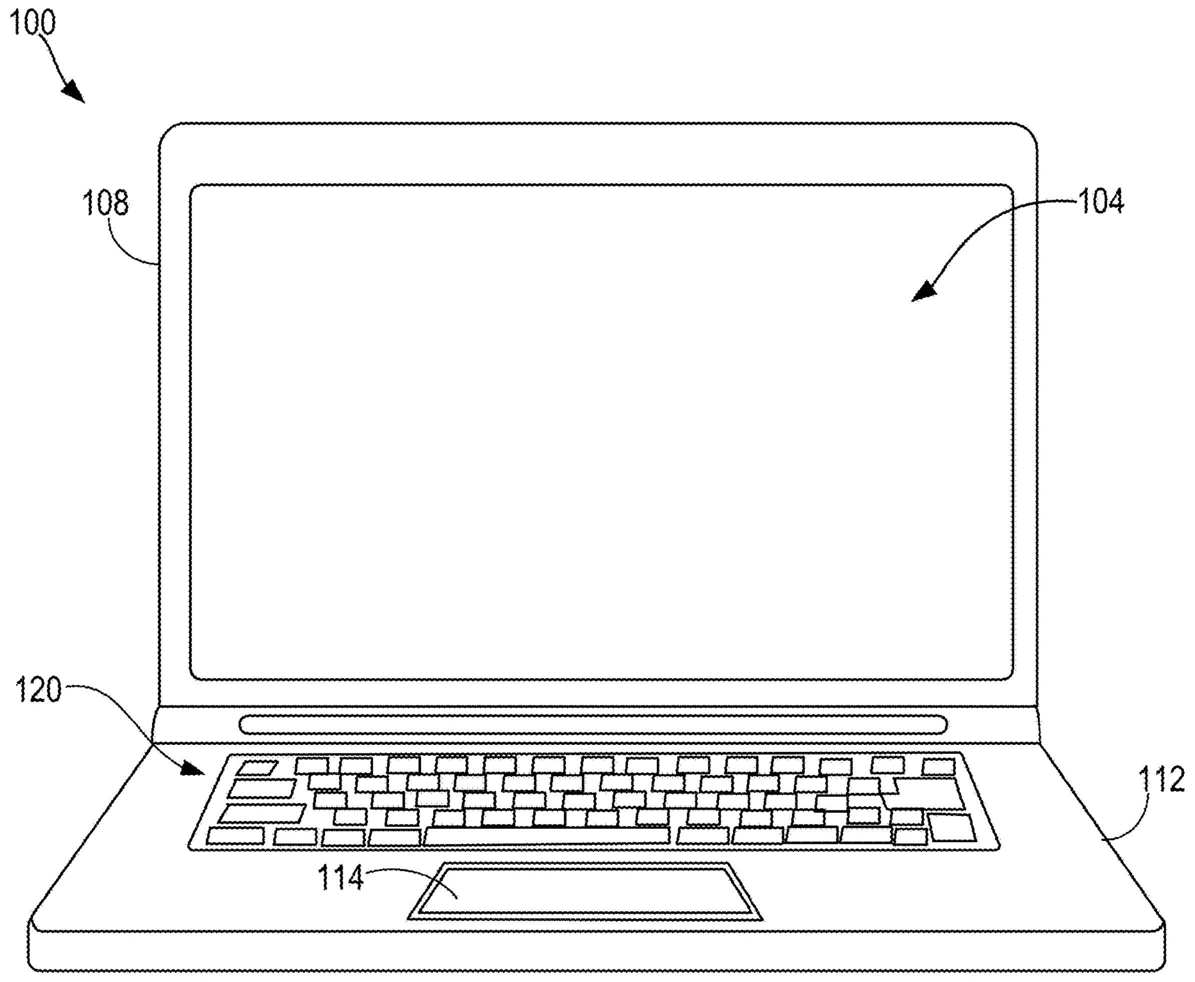
FIG. 1 shows one example of a computing device comprising a touchpad according to examples of the present disclosure.
Figure 2:
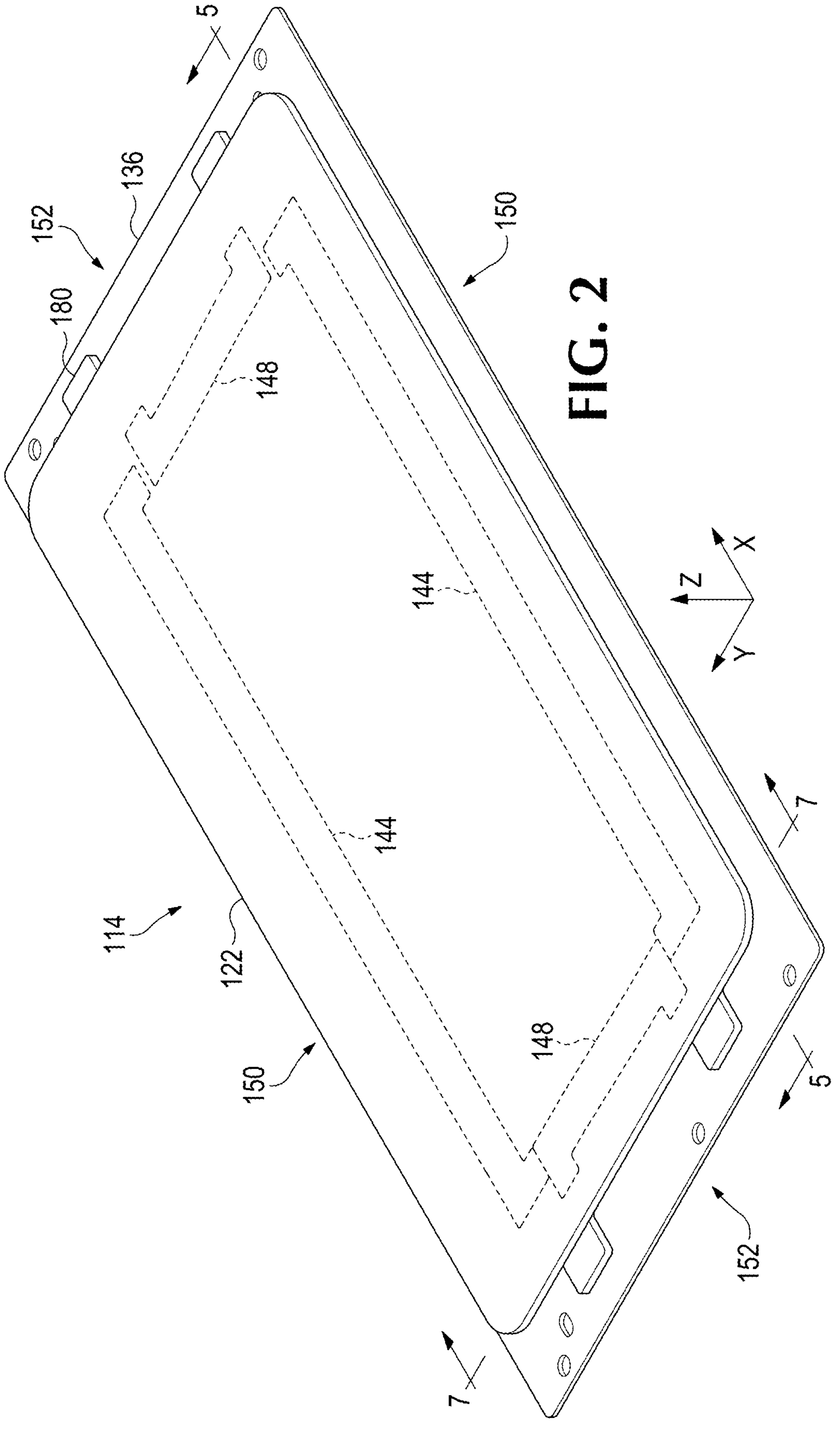
FIG. 2 shows a top perspective view of the touchpad of FIG. 1 according to examples of the present disclosure.
Figure 3:
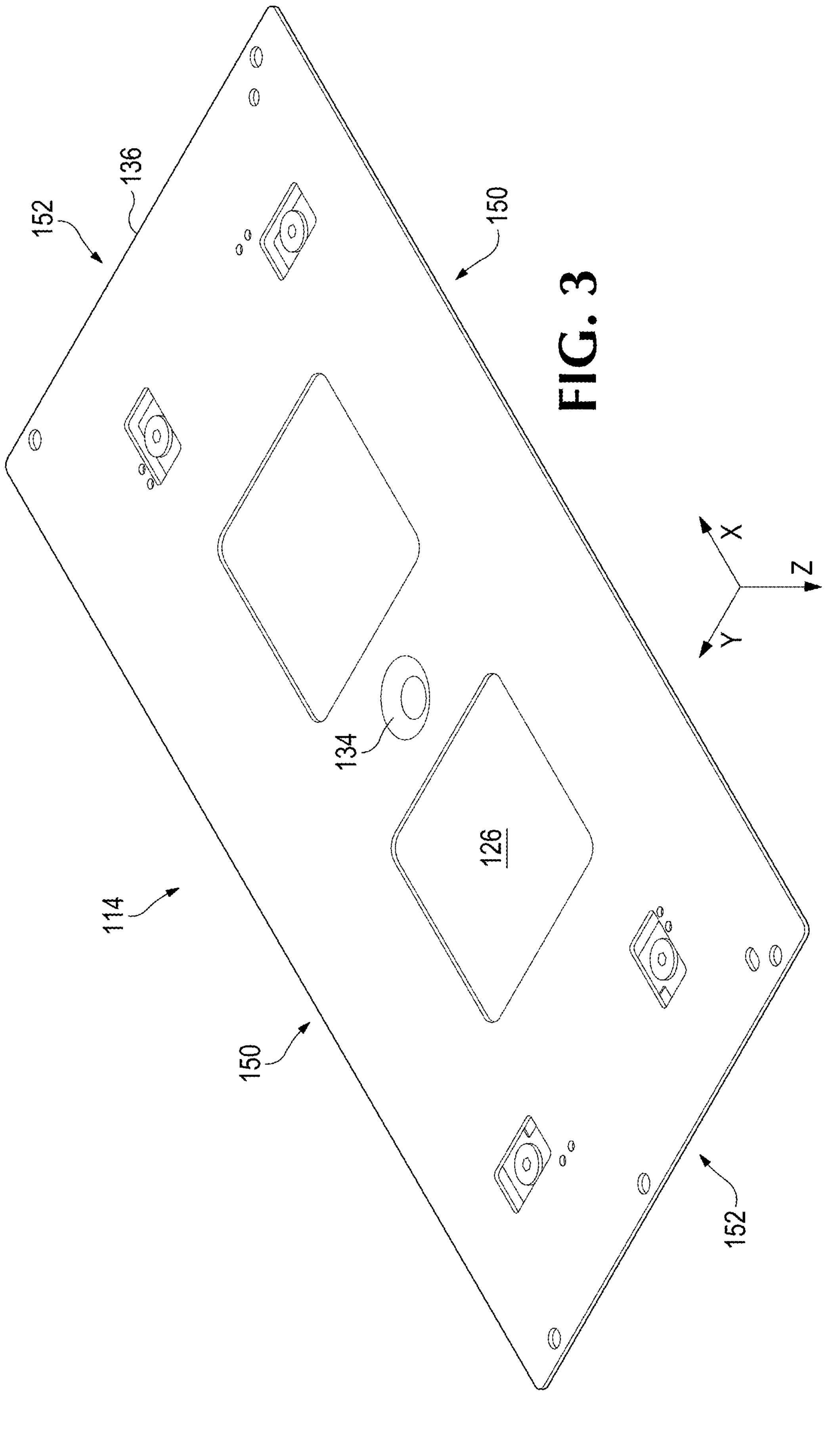
FIG. 3 shows a bottom perspective view of the touchpad of FIG. 1 according to examples of the present disclosure.

With reference now to FIG. 1, an example computing device 100 in the form of a laptop computer is illustrated. In other examples, aspects of the present disclosure can be implemented in tablet computing devices, foldable computing devices, wearable and other mobile computing devices, game controllers, and any other type of computing device that utilizes a touch input device. Computing device 100 includes a display 104 on a display substrate 108 that is rotatably coupled to a chassis 112. Chassis 112 includes a user input device in the form of touchpad 114 and a keyboard 120 mounted therein.

With reference now to FIGS. 2-8, one example of an input device, such as touchpad 114, according to examples of the present disclosure will be described. In this example and with reference to FIGS. 2 and 4, touchpad 114 comprises a touch surface in the form of a glass substrate 122 that is affixed to a printed circuit board 126 (see FIG. 4). In the present example, glass substrate 122 is affixed to printed circuit board 126 via an adhesive layer 128 (see FIG. 5). As described further below and with reference again to FIG. 4, a switch 130 is mounted to the printed circuit board 126 and aligned with a boss 134 protruding from a mounting bracket 136. Advantageously, switch 130 is configured to be actuated by boss 134 upon a touch input being received at the glass substrate 122. More particularly and as described further below, configurations of the present disclosure utilize a plurality of flat springs to substantially uniformly transfer a load received from a touch input across the printed circuit board 126 to cause the printed circuit board and mounted switch 130 to evenly translate towards the boss 134 and mounting bracket 136, with the printed circuit board remaining substantially planar to the mounting bracket. Advantageously and in this manner, these configurations reliably trigger actuation of the switch 130 regardless of where the touch input is received on the glass substrate 122.

To generate the above-described movements, and in one potential advantage of the present disclosure, touchpad 114 utilizes a plurality of flat springs that each comprise a bracket end affixed to the mounting bracket 136 and an opposite end that is coupled, directly or indirectly, to the printed circuit board 126. In the examples described herein and with reference to FIGS. 2 and 4, the plurality of flat springs comprise two side flat springs 144 having a first length and two end flat springs 148 having a second length less than the first length. As shown in this example, the two side flat springs 144 extend substantially perpendicular to the two end flat springs 148. Additionally, the two side flat springs 144 and the two end flat springs 148 are arranged substantially end-to-end to form a rectangular shape in this example. In one potential advantage of this configuration, the arrangement of the two side flat springs 144 and two end flat springs 148 to form a rectangular shape assists the touchpad 144 in substantially uniformly transferring a load received from a touch input to reliably trigger actuation of the switch 130 regardless of where the touch input is received on the glass substrate 122 of the input device.

As described in more detail below, each of the side flat springs 144 and end flat springs 148 are preloaded and configured to bias the printed circuit board 126 away from the mounting bracket 136. In this manner and with reference to FIG. 7, this configuration of preloaded side flat springs 144 and preloaded end flat springs 148 creates a nominal gap 190 between the upper surface of the glass substrate 122 and the upper surface of the mounting bracket 136. As described further below and in this example, in this nominal position the boss 134 protruding from mounting bracket 136 is in contact with switch 130 but has not actuated the switch. In other examples, a small gap can exist between the end of the switch 130 and the boss 134 in this nominal position. In one potential advantage of this configuration, creating the nominal gap 190 provides space for the glass substrate 122, printed circuit board 126, and switch 130 to translate in the negative z-axis direction when receiving a touch input and thereby cause the switch to be depressed and actuated by boss 134.

As described further below, and in one potential advantage of the present disclosure, in response to a touch input on the glass substrate 122, this arrangement of the side flat springs 144 and end flat springs 148 causes the springs to substantially uniformly transfer the corresponding loads across the printed circuit board 126 and evenly advance the printed circuit board towards the boss 134 and mounting bracket 136 as described above. Additionally and with reference to FIG. 2, in this example the two side flat springs 144 and two end flat springs 148 are also located near the sides 150 and ends 152, respectively, of the mounting bracket 136. As described further below, and in one potential advantage of the present disclosure, by arranging the side flat springs 144 and end flat springs 148 substantially end-to-end and locating the springs near the sides 150 and ends 152 of the mounting bracket 136, the springs function to evenly distribute the load of a touch input on the glass substrate 122 to consistently and reliably trigger actuation of the switch 130 regardless of where the touch input is received on the glass substrate.

As noted above, each of the side flat springs 144 and end flat springs 148 comprises a bracket end affixed to the mounting bracket 136 and an opposite end that is coupled, directly or indirectly, to the printed circuit board 126. In the example of FIGS. 2-8, the bracket end 160 of each of the side flat springs 144 is affixed to mounting bracket 136 via spot welds 168 (see FIGS. 4 and 5). In this example, the opposite end 172 of each of the side flat springs 144 is affixed to a stiffener plate 180, and the stiffener plate is affixed to the printed circuit board 126. In the present example, stiffener plate 180 is affixed to printed circuit board 126 using an adhesive layer 182 (see, FIGS. 5 and 7). In other examples stiffener plate 180 can be affixed to printed circuit board 126 via fasteners or in any other suitable manner.

Figure 4:
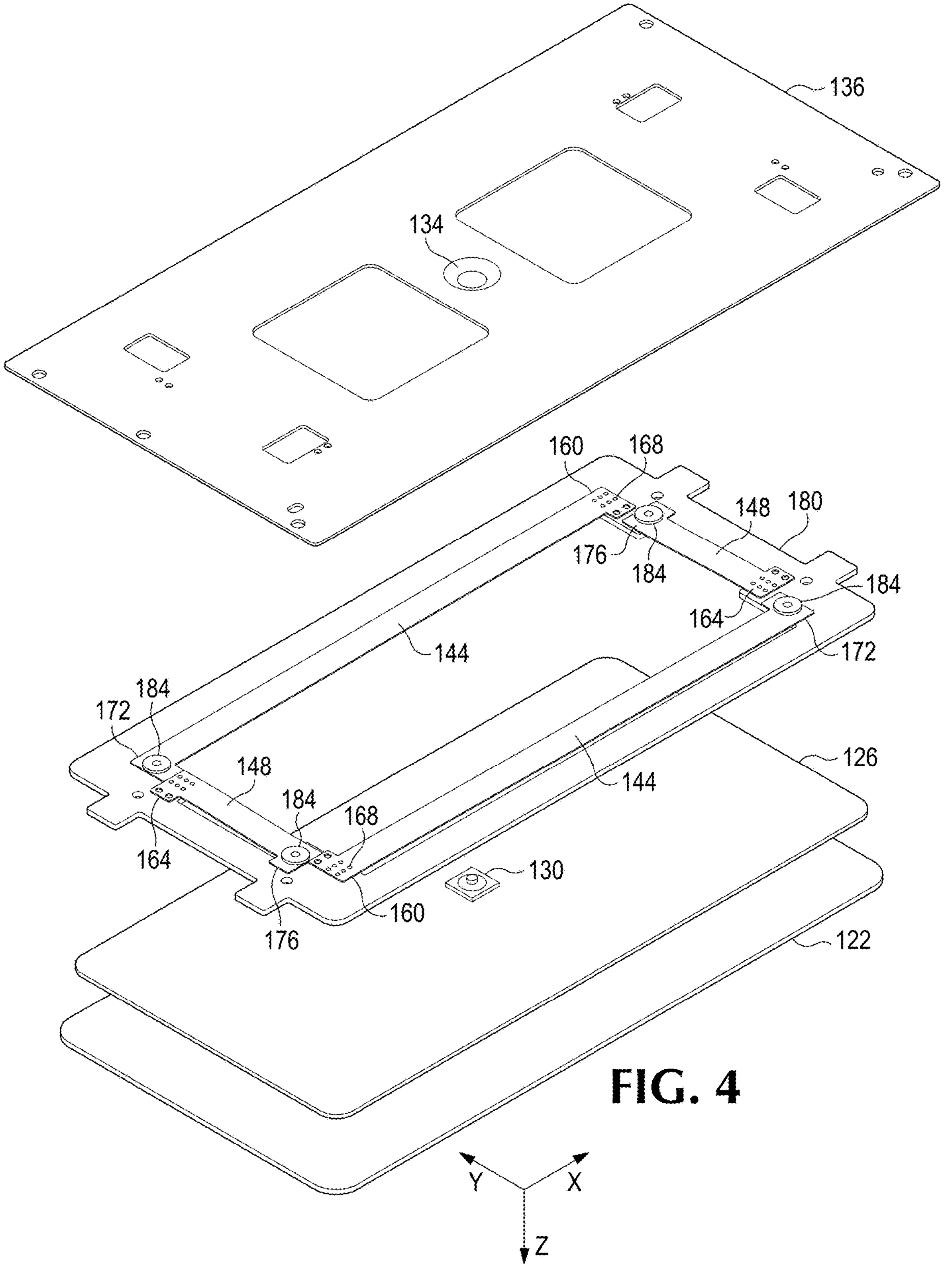
FIG. 4 shows an exploded view of the touchpad of FIG. 3 according to examples of the present disclosure.
Figure 5:
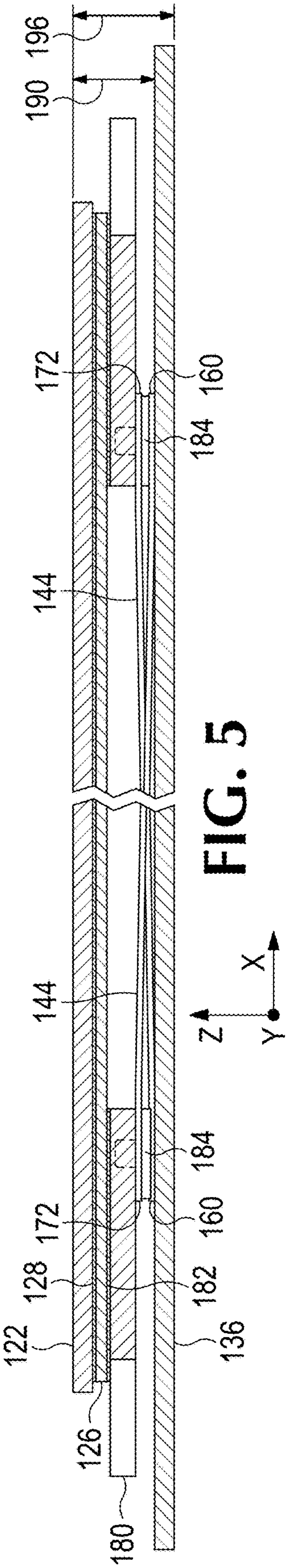
FIG. 5 shows a cross-sectional side view of the touchpad taken along line 5-5 of FIG. 2

In this example, the opposite end 172 of each of the side flat springs 144 is removably fastened to stiffener plate 180 using screws 184 (see FIGS. 4 and 5). In one potential advantage of this configuration, touchpad 114 can be easily disassembled, such as for inspection or repair, by removing screws 184 that fasten the opposite end 172 of the side flat springs 144 to stiffener plate 180. In other examples, the opposite end 172 of each of the side flat springs 144 can be non-removably affixed to stiffener plate 180 using spot welds, adhesive, or any other suitable manner.

Figure 6:
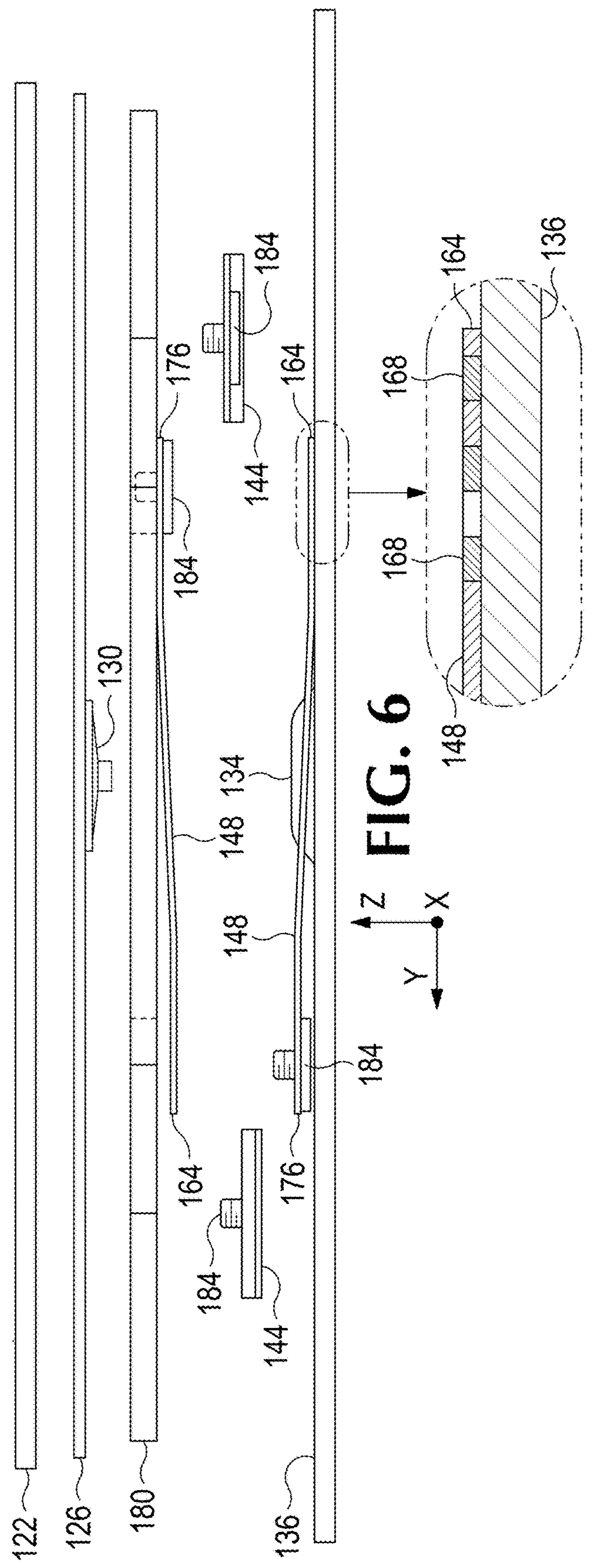
FIG. 6 shows an end elevational exploded view of the touchpad of FIG. 2 according to examples of the present disclosure.
Figure 7:
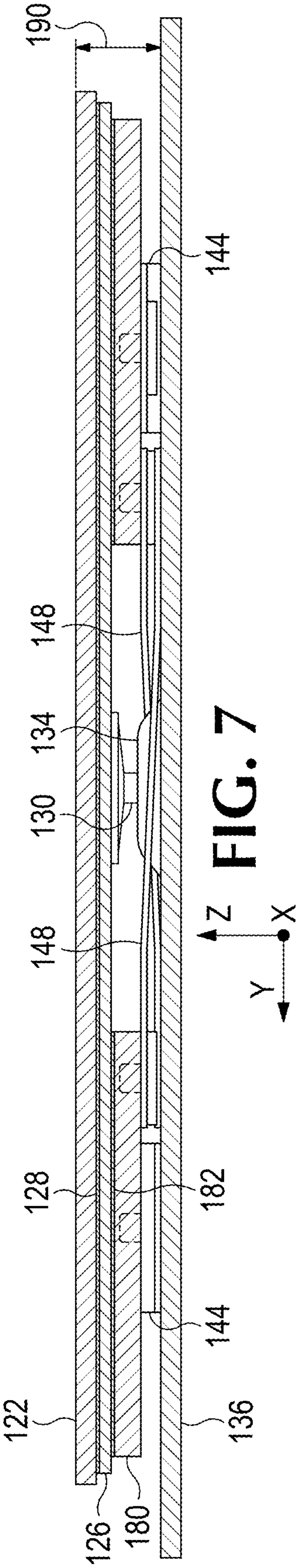
FIG. 7 shows a cross-sectional end view taken along line 7-7 of FIG. 2.

In a similar manner and as noted above, each of the end flat springs 148 comprises a bracket end 164 affixed to the mounting bracket 136 and an opposite end 176 that is coupled, directly or indirectly, to the printed circuit board 126. With reference to FIGS. 4, 6, and 7, in this example the bracket end 164 of each of the end flat springs 148 is affixed to mounting bracket 136 via spot welds 168 (see FIGS. 4 and 6). In this example, the opposite end 176 of each of the end flat springs 148 is affixed to the stiffener plate 180 which is affixed to the printed circuit board 126.

In this example and similar to the side flat springs 144, the opposite end 176 of each of the end flat springs 148 is removably fastened to stiffener plate 180 using screws 184 (see FIGS. 4 and 6). As noted above and in one potential advantage of this configuration, touchpad 114 can be easily disassembled, such as for inspection or repair, by removing screws 184 that fasten the opposite end 176 of the end flat springs 148 to stiffener plate 180. In other examples, the opposite end 176 of each of the end flat springs 148 can be non-removably affixed to stiffener plate 180 using spot welds, adhesive, or any other suitable manner.

In this example, and in another potential advantage of the present disclosure, utilizing stiffener plate 180 to indirectly couple the opposite ends of each of the springs to the printed circuit board 126 provides enhanced structural integrity to the printed circuit board and the touchpad.

Figure 8:
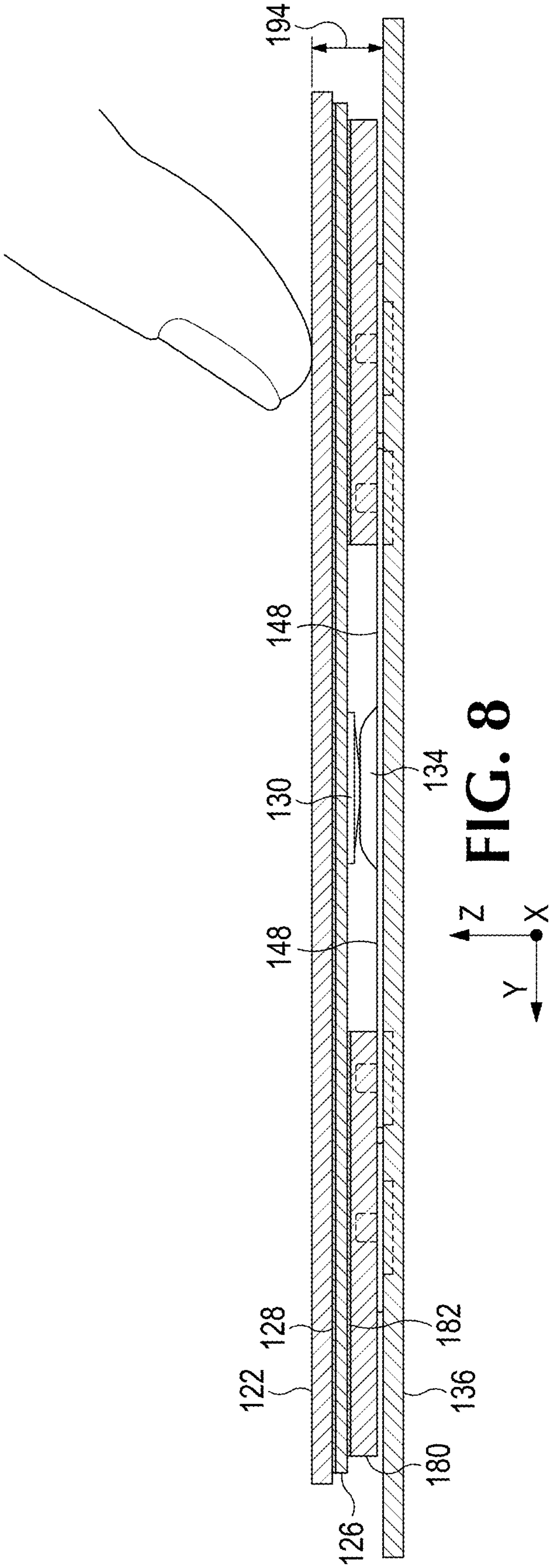
FIG. 8 shows the touchpad of FIG. 7 depressed via contact by a finger.

Advantageously and as noted above, the present configuration of side flat springs 144 and end flat springs 148 functions to evenly distribute the load of a touch input on the glass substrate 122 to consistently and reliably trigger actuation of the switch 130, regardless of where the touch input is received on the glass substrate. For example and with reference now to the end view of FIG. 8, in this example a user is contacting the glass substrate 122 off center and toward one side of the glass substrate 122. Advantageously, the side flat springs 144 and end flat springs 148 evenly distribute the load of the input to substantially uniformly lower glass substrate 122, printed circuit board 126, and switch 130 in the negative z-axis direction to cause the switch to be depressed and actuated by boss 134. With reference to FIGS. 7 and 8, in this example the switch 130 is actuated by translating the glass substrate 122, printed circuit board 126, and switch 130 from the nominal position of FIG. 7 (corresponding to the nominal gap 190) to the actuated position of FIG. 8 and the corresponding, smaller actuated gap 194 between the upper surface of the glass substrate 122 and the upper surface of the mounting bracket 136.

In one non-limiting use case example of FIGS. 7 and 8, the glass substrate 122 is translated approximately 0.50 mm in the negative z-axis direction at the finger's point of contact off center and toward one side of the glass substrate, while the middle portion of the glass substrate that overlies the switch 130 is translated by a substantially equivalent distance of approximately 0.49 mm in the negative z-axis direction to cause the switch to be depressed and actuated by boss 134. Accordingly and in this manner, the side flat springs 144 and end flat springs 148 evenly distribute the load of the input to substantially uniformly lower glass substrate 122, printed circuit board 126, and switch 130 in the negative z-axis direction to cause the switch to be depressed and actuated by boss 134.

In another potential advantage of the present disclosure and as noted above, utilizing the disclosed configurations of side flat springs 144 and end flat springs 148 enables touchpad 114 to embody a low-profile form factor. In some examples of the above-described configuration and with reference again to FIG. 5, an overall thickness 196 of touchpad 114 can be approximately 3.1 mm. Advantageously, the low-profile form factor of touchpad 114 reduces the packaging space occupied by the touchpad in the corresponding computing device. Additionally, touchpads of the present disclosure utilizing side flat springs 144 and end flat springs 148 are inexpensive and relatively simple to manufacture compared other touchpad designs, such as devices utilizing multiple pressure sensors and/or haptic components.

Figure 9:
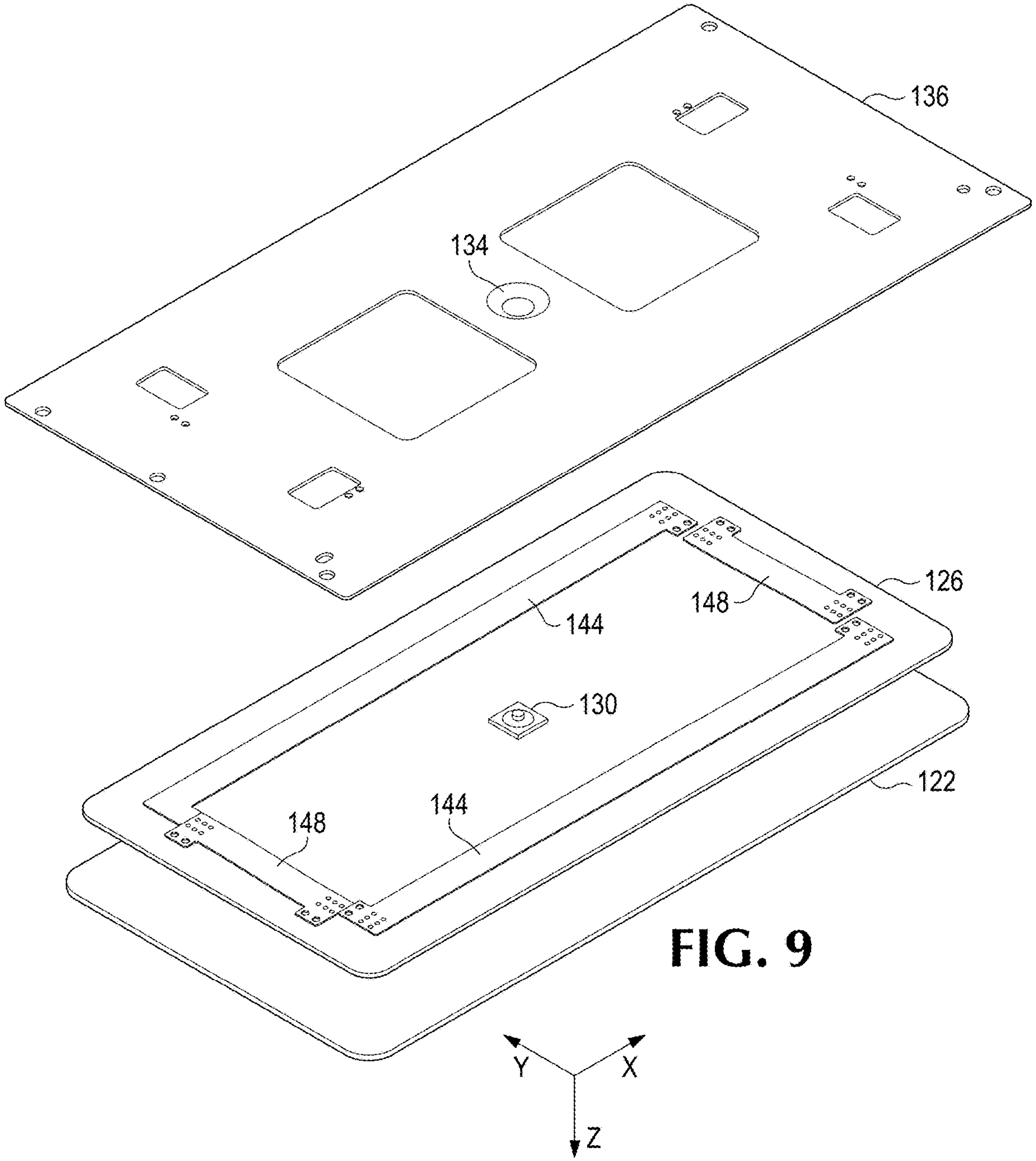
FIG. 9 shows a bottom exploded view of another example touchpad according to examples of the present disclosure.

In other examples, touchpads of the present disclosure can be configured without a stiffener plate 180. In one example and with reference to FIG. 9, another embodiment of touchpad 114 includes all of the components described above except for a stiffener plate. In this example, the opposite ends 172 of each of the side flat springs 144 and the opposite ends 176 of each of the end flat springs 148 are directly affixed to the printed circuit board 126. In this example, the opposite ends of each of the flat springs are affixed to the printed circuit board 126 via spot welds. In other examples, the opposite ends of each of the flat springs can be affixed to the printed circuit board 126 using adhesive or in any other suitable manner. In one potential advantage of this configuration, by eliminating the stiffener plate the overall thickness of the touchpad is further reduced, thereby further reducing the packaging space occupied by the touchpad in the corresponding computing device.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the application. In one aspect an input device comprises a touch surface; a printed circuit board; a switch mounted to the printed circuit board; a mounting bracket comprising a boss aligned with the switch; and a plurality of flat springs each comprising a bracket end affixed to the mounting bracket and an opposite end coupled to the printed circuit board. The input device may additionally or alternatively include, wherein the opposite end of each of the flat springs is affixed to the printed circuit board. The input device may additionally or alternatively include, wherein the opposite end of each of the flat springs is affixed to a stiffener plate, and the stiffener plate is affixed to the printed circuit board. The input device may additionally or alternatively include, wherein the opposite end of each of the flat springs is removably fastened to the stiffener plate. The input device may additionally or alternatively include, wherein each of the flat springs is configured to bias the printed circuit board away from the mounting bracket. The input device may additionally or alternatively include, wherein the plurality of flat springs comprise two side flat springs having a first length and two end flat springs having a second length less than the first length. The input device may additionally or alternatively include, wherein the two side flat springs extend substantially perpendicular to the two end flat springs. The input device may additionally or alternatively include, wherein the two side flat springs and the two end flat springs are arranged substantially end-to-end. The input device may additionally or alternatively include, wherein the input device is a touchpad.

Another aspect provides a computing device comprising an input device comprising: a touch surface; a printed circuit board; a switch mounted to the printed circuit board; a mounting bracket comprising a boss aligned with the switch; and a plurality of flat springs each comprising a bracket end affixed to the mounting bracket and an opposite end coupled to the printed circuit board. The computing device may additionally or alternatively include, wherein the opposite end of each of the flat springs is affixed to the printed circuit board. The computing device may additionally or alternatively include, wherein the opposite end of each of the flat springs is affixed to a stiffener plate, and the stiffener plate is affixed to the printed circuit board. The computing device may additionally or alternatively include, wherein the opposite end of each of the flat springs is removably fastened to the stiffener plate. The computing device may additionally or alternatively include, wherein each of the flat springs is configured to bias the printed circuit board away from the mounting bracket. The computing device may additionally or alternatively include, wherein the plurality of flat springs comprise two side flat springs having a first length and two end flat springs having a second length less than the first length.

Another aspect provides a touchpad comprising: a touch surface; a printed circuit board; a switch mounted to the printed circuit board; a mounting bracket comprising a boss aligned with the switch; a stiffener plate between the mounting bracket and the printed circuit board, the stiffener plate affixed to the printed circuit board; and a plurality of flat springs each comprising a bracket end affixed to the mounting bracket and an opposite end affixed to the stiffener plate. The touchpad may additionally or alternatively include, wherein the opposite end of each of the flat springs is affixed to the stiffener plate, and the stiffener plate is affixed to the printed circuit board. The touchpad may additionally or alternatively include, wherein the opposite end of each of the flat springs is removably fastened to the stiffener plate. The touchpad may additionally or alternatively include, wherein each of the flat springs is configured to bias the printed circuit board away from the mounting bracket. The touchpad may additionally or alternatively include, wherein the plurality of flat springs comprise two side flat springs having a first length and two end flat springs having a second length less than the first length.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An input device, comprising:

a touch surface;

a printed circuit board;

a switch mounted to the printed circuit board;

a mounting bracket comprising a boss aligned with the switch; and a plurality of flat springs each comprising a bracket end affixed to the mounting bracket and an opposite end coupled to the printed circuit board, wherein the bracket end and the opposite end are located within a perimeter of the touch surface.

2. The input device of claim 1, wherein the opposite end of each of the flat springs is affixed to the printed circuit board.

3. The input device of claim 1, wherein the opposite end of each of the flat springs is affixed to a stiffener plate, and the stiffener plate is affixed to the printed circuit board.

4. The input device of claim 3, wherein the opposite end of each of the flat springs is removably fastened to the stiffener plate.

5. The input device of claim 1, wherein each of the flat springs is configured to bias the printed circuit board away from the mounting bracket.

6. The input device of claim 1, wherein the plurality of flat springs comprise two side flat springs having a first length and two end flat springs having a second length less than the first length.

7. The input device of claim 6, wherein the two side flat springs extend substantially perpendicular to the two end flat springs.

8. The input device of claim 7, wherein the two side flat springs and the two end flat springs are arranged substantially end-to-end.

9. The input device of claim 1, wherein the input device is a touchpad.

10. A computing device comprising:

an input device comprising:

a touch surface;

a printed circuit board;

a switch mounted to the printed circuit board;

a mounting bracket comprising a boss aligned with the switch; and a plurality of flat springs each comprising a bracket end affixed to the mounting bracket and an opposite end coupled to the printed circuit board, wherein the bracket end and the opposite end are located within a perimeter of the touch surface.

11. The computing device of claim 10, wherein the opposite end of each of the flat springs is affixed to the printed circuit board.

12. The computing device of claim 10, wherein the opposite end of each of the flat springs is affixed to a stiffener plate, and the stiffener plate is affixed to the printed circuit board.

13. The computing device of claim 12, wherein the opposite end of each of the flat springs is removably fastened to the stiffener plate.

14. The computing device of claim 10, wherein each of the flat springs is configured to bias the printed circuit board away from the mounting bracket.

15. The computing device of claim 10, wherein the plurality of flat springs comprise two side flat springs having a first length and two end flat springs having a second length less than the first length.

16. A touchpad comprising:

a touch surface;

a printed circuit board;

a switch mounted to the printed circuit board;

a mounting bracket comprising a boss aligned with the switch;

a stiffener plate between the mounting bracket and the printed circuit board, the stiffener plate affixed to the printed circuit board; and a plurality of flat springs each comprising a bracket end affixed to the mounting bracket and an opposite end affixed to the stiffener plate, wherein the bracket end and the opposite end are located within a perimeter of the touch surface.

17. The touchpad of claim 16, wherein the opposite end of each of the flat springs is affixed to the stiffener plate, and the stiffener plate is affixed to the printed circuit board.

18. The touchpad of claim 17, wherein the opposite end of each of the flat springs is removably fastened to the stiffener plate.

19. The touchpad of claim 16, wherein each of the flat springs is configured to bias the printed circuit board away from the mounting bracket.

20. The touchpad of claim 16, wherein the plurality of flat springs comprise two side flat springs having a first length and two end flat springs having a second length less than the first length.

* * * * *